United States Patent
Van Der Poel et al.

(10) Patent No.: US 11,877,370 B2
(45) Date of Patent: Jan. 16, 2024

(54) INTERIOR LIGHTING SYSTEM

(71) Applicant: SIGNIFY HOLDING B.V., Eindhoven (NL)

(72) Inventors: Lucas Leo Desire Van Der Poel, Waalre (NL); Maurice Alexander Hugo Donners, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 729 days.

(21) Appl. No.: 16/475,475

(22) PCT Filed: Dec. 19, 2017

(86) PCT No.: PCT/EP2017/083562
§ 371 (c)(1),
(2) Date: Jul. 2, 2019

(87) PCT Pub. No.: WO2018/122042
PCT Pub. Date: Jul. 5, 2018

(65) Prior Publication Data
US 2021/0176840 A1 Jun. 10, 2021

(30) Foreign Application Priority Data
Jan. 2, 2017 (EP) .................................... 17150003

(51) Int. Cl.
*F21S 19/00* (2006.01)
*F21V 7/00* (2006.01)
*F21V 23/04* (2006.01)
*H05B 47/11* (2020.01)
*E06B 9/24* (2006.01)
*F21S 8/00* (2006.01)

(52) U.S. Cl.
CPC ............... *H05B 47/11* (2020.01); *E06B 9/24* (2013.01); *F21S 8/033* (2013.01); *F21S 19/005* (2013.01); *F21V 7/005* (2013.01); *F21V 23/0464* (2013.01); *E06B 2009/247* (2013.01)

(58) Field of Classification Search
CPC .. F21V 33/006; F21V 23/0442; F21V 7/0008; F21V 23/0464; F21V 21/02; F21V 17/00; F21S 19/00
See application file for complete search history.

(56) References Cited

U.S. PATENT DOCUMENTS

| | | | |
|---|---|---|---|
| 7,190,126 B1 | 3/2007 | Paton | |
| 8,337,039 B1* | 12/2012 | Larkin | H02S 40/38 362/145 |
| 2012/0320560 A1* | 12/2012 | Van Der Poel | E06B 9/32 362/1 |
| 2013/0009552 A1 | 1/2013 | Page | |
| 2014/0003038 A1* | 1/2014 | Kim | F21L 4/08 362/183 |
| 2016/0143117 A1 | 5/2016 | Vissenberg et al. | |
| 2016/0374176 A1 | 12/2016 | Van Der Poel | |

FOREIGN PATENT DOCUMENTS

| | | |
|---|---|---|
| DE | 10224421 A1 | 4/2004 |
| EP | 2566303 B1 | 2/2018 |

* cited by examiner

*Primary Examiner* — William J Carter

(57) ABSTRACT

An interior lighting system has arrangement of lighting panels mounted around a window for providing lighting around the outside of the window. The light provided depends on the exterior lighting which passes through the window. In this way, contrast between the window and the wall around the window can be reduced.

10 Claims, 4 Drawing Sheets

INTERIOR LIGHTING SYSTEM

CROSS-REFERENCE TO PRIOR APPLICATIONS

This application is the U.S. National Phase application under 35 U.S.C. § 371 of International Application No. PCT/EP2017/083562, filed on Dec. 19, 2017, which claims the benefit of European Patent Application No. 17150003.6, filed on Jan. 2, 2017. These applications are hereby incorporated by reference herein.

FIELD OF THE INVENTION

This invention relates to interior lighting systems, and in particular to providing lighting which depends on the light entering the interior space through one or more windows.

BACKGROUND OF THE INVENTION

It is known that visual discomfort may be caused in an interior when the outside brightness is very high (caused by daylight circumstances like sunny weather, a clear sky or white neighboring buildings which reflect the day light) and this bright light enters an interior space through a window.

There is then a large contrast between the relatively dark interior walls surrounding a window and the view visible through the window. This problem is greater for countries closer to the equator. The difference in brightness can be so high that the eye has to adapt all the time between these two extremes. This leads to an uncomfortable situation which causes fatigue and possible headaches.

To address this problem, people will close the blinds or curtains to shield the brightness outside. Often they will then forget to re-open them again when the uncomfortable situation is over. This results in less daylight entering the building which means that electric lights may be left on full power all the time. This is undesired since daylight harvesting (using daylight falling through windows) is used to save energy and help to create a more sustainable building.

People want to keep a visual contact with the outside world, so that it would be of interest to avoid the need to close blinds or curtains even during periods of high outdoor brightness. A view of a natural scene of plants or countryside has a particularly positive influence on the feeling of well-being and can help to reduce stress levels of people.

SUMMARY OF THE INVENTION

The invention is defined by the claims.

According to examples in accordance with an aspect of the invention, there is provided an interior lighting system comprising:

an arrangement of lighting panels adapted to be mounted at least on opposite lateral sides of a window for providing lighting visible as luminance at a wall surface around the outside of the window and adjacent to the window;

a light sensor arrangement for sensing the exterior lighting level outside or through the window; and a controller for controlling the lighting delivered by the arrangement of lighting panels in dependence on the sensed exterior lighting level.

This system provides lighting around a window and provides a solution to the contrast problems described above. It can also be used to balance the lighting provided in an interior space, and thus provide generally pleasant aesthetic lighting.

The exterior lighting outside the window may be sensed as a general luminance level (i.e. brightness) passing through the window or a brightness of the scene visible through the window. This scene may include luminance as reflected light from objects within the scene as well as direct lighting areas such as the sky and sun.

This luminance level passing through the window is seen by the eyes, and may create a large contrast with the luminance seen at the walls around the window.

The system makes use of lighting panels, for example using LEDs. The lighting may be based on a reflector or a translucent panel with backlighting, to increase the brightness of the vertical walls around the window. The contrast between the window and the surrounding walls is thus lowered. The panels are placed close to the window or even overlapping with the window.

In a first set of arrangements, each lighting panel comprises a reflector for reflecting part of the exterior light which passes through the window to the vertical wall surface. Each lighting panel then also comprises a light source for directing light to the reflector.

The reflector may receive a small part of the entering daylight away from the edge of the window panel and reflect it to the wall surface. The amount of reflected light will vary in intensity in dependence on the amount of daylight coming through the window. When there is not enough daylight entering the interior space via the window extra additional artificial light sources (e.g. LED strips) behind the reflector may be used to create an increased indirect lighting effect on the wall to a preferred level.

For example, for windows in the north façade (for the northern hemisphere) there will be less light coming through the window but the view may still be into a bright sunny landscape. Additional lighting may therefore be desired. When the window is in the south façade (for the northern hemisphere) more daylight will be coming through the window so there will be less need for additional light if part of that incoming light is used for lighting the wall surface. For east or west oriented windows, lighting panels on the left and right sides may even be controlled independently since one side will receive much more light than the other so on one side more compensating extra artificial light is needed.

To avoid that the reflector itself becomes a dark frame creating extra contrast, the reflector can be made with perforations or additional LED strips at the front which will bring light to the front of the reflector.

In another set of examples, each lighting panel comprises a backlight and a diffusive cover.

The diffusive cover is for example a semi-translucent material which allows some of the daylight to pass through the material to increase the brightness. It is also possible to use a translucent panel only with backlighting, i.e. without having daylight passing through. The brightness is then controlled fully by the light source arrangement.

As explained above, the lighting panel may receive some of the exterior light. For this purpose, each lighting panel may comprise a first portion for overlapping an edge of the window thereby for receiving part of the exterior light which passes through the window and a second portion for overlapping a wall around the edge of the window.

Each panel may be controllable to provide a non-uniform light output over its area, wherein the light output is greater at an edge for mounting adjacent or overlapping the window than at an edge for mounting away from the window.

This approach provides a soft gradient between the bright window and the darker walls around the window. This can be realized by using optical solutions such as non-planar reflectors or lens arrangements, or by having LED lighting with different density of lighting elements (i.e. individual LEDs) at different regions.

Each panel may further comprise sound absorbing material. This can be used to increase the sound comfort in the space by reducing sound reverberations.

The light sensor arrangement may comprise a light sensor facing the window and a light sensor facing the wall surface adjacent the window. In this way, instead of measuring only the exterior lighting, a contrast may be monitored and used as a feedback control parameter.

The color temperature and/or color point of the lighting provided by the lighting panel is for example controllable. In one example, this simply enables aesthetic lighting effects to be created.

However, the controllable color may be combined with a light sensor arrangement comprising a light sensor facing the window which has color sensing capability. In this way, the color temperature and/or color point of the lighting provided by the lighting panel may be controllable in dependence on the sensed exterior lighting color. This means the general appearance of the scene through the window is extended by the additional wall surface lighting.

The system may comprise first and second lighting panels for mounting at opposite lateral sides of the window. Alternatively, there may be first to fourth lighting panels for mounting all around the sides of the window.

It is known that lighting issued from a vertical plane has a large impact on how a space is perceived. By providing lighting in vertical planes a space can be made to look bigger.

The control of the system may be combined with the control of general ceiling lighting. For example a balance may be provided between horizontal (ceiling) and vertical (wall) lighting levels. It may for example be possible to dim the general ceiling lighting levels to save energy. When large parts of a space such as an open office space are not occupied by people, the ceiling lighting can be dimmed since the wall mounted panels of the system will create a bright impression in the distant field of view for the present users. The vertical wall lighting is more visible to distant viewers than the horizontal ceiling lighting.

Examples in accordance with a second aspect of the invention provide a method of providing interior lighting, comprising:

sensing exterior lighting outside or through a window between an interior space and the exterior;

providing lighting from a wall surface around the outside of the window using an arrangement of lighting panels mounted at least on opposite lateral sides of the window and adjacent to the window, wherein the method comprises controlling the lighting delivered by the arrangement of lighting panels in dependence on the sensed exterior lighting.

The method may comprise:

overlapping a first portion of each lighting panel with an edge of the window and overlapping a second portion of each lighting panel with a wall around the edge of the window; and reflecting part of the exterior light which reaches the first portion to the wall surface; or passing part of the exterior light which reaches the first portion through a diffusive panel cover.

The method may comprise sensing the color of the light entering the interior space through the window and controlling the color temperature and/or color point of the lighting provided by the lighting panel in dependence on the sensed color.

In the context of the present invention, in the pharse "adjacent to the window", the term "adjacent" should be understood as adjoining, overlapping with or next to the edge window.

BRIEF DESCRIPTION OF THE DRAWINGS

Examples of the invention will now be described in detail with reference to the accompanying drawings, in which:

FIG. 5 shows an office space with two windows each with blinds, with the blinds closed and the lights on;

DETAILED DESCRIPTION OF THE EMBODIMENTS

The invention provides an interior lighting system in which an arrangement of lighting panels is mounted around a window for providing lighting which appears as luminance at a wall surface around the outside of the window. The light provided depends on the exterior lighting which passes through the window, or the brightness visible through the window. In this way, contrast between the window and the wall around the window can be reduced. The light is provided "from a wall surface" in the sense that for an observer, the light appears to originate from that location. The light itself may be output outwardly from lighting panels which lie over the wall surface, or it may be light reflected from the actual wall surface. Some of the light may also be derived from the natural external lighting.

Figure 1:
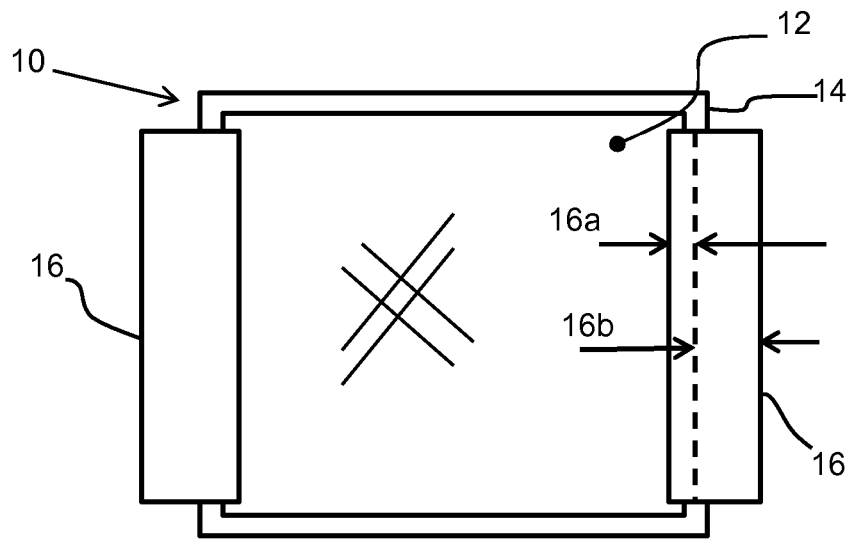
FIG. 1 shows an example of the lighting system installed around a window.

FIG. 1 shows an example of the lighting system installed around a window 10. The window comprises glazing 12 and a window frame 14. The lighting system has two panels 16 which provide a light output which appears to come from the wall surface on each lateral side of the window 10.

The lighting panels may be just outside the window area, or they may overlap the window area as is shown in FIG. 1.

The lighting panels provide lighting around the window so that the contrast between the window and the walls is reduced when there is bright light coming through the window. The lighting panels may also be used for general lighting, for example when it is dark outside (for example with blinds closed).

The lighting panels for example have LED strips. They may emit light outwardly (away from the wall surface) or they may emit light inwardly towards the wall surface so that the light which is emitted is then reflected from the wall surface.

Figure 2:
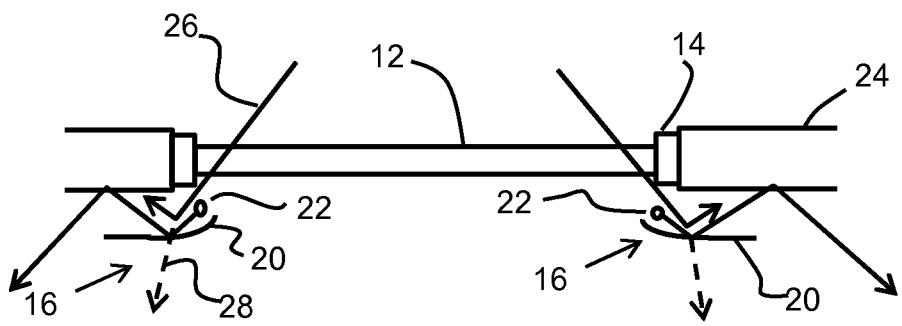
FIG. 2 shows a first example of a design of the lighting panels.

FIG. 2 shows a first example of a design of the lighting panels. Each panel 16 comprises a reflector 20 and a light source 22. The light source 22 provides light towards the reflector, which then redirects the light towards the wall surface 24. The area of the wall surface which is illuminated may then be larger than the area of the panel itself.

As mentioned above, the lighting panels 16 may be provided beyond the outer periphery of the window, on the wall surface. FIG. 2 instead shows overlap over the window area. This means that some natural external light 26 may be used for the wall surface illumination. In particular, the lighting panel 16 comprises a first portion 16a (see FIG. 1) overlapping an edge of the window thereby for receiving part 26 of the exterior light which passes through the window. A second portion 16b overlaps a wall around the edge of the window.

The reflector design enables a thin lighting border to be provided around the window, and light is generated laterally outwardly to illuminate a larger wall surface area.

To avoid the border being dark in this case, the reflector may be made partially transmissive, so that the light source light and the exterior light can also pass partially through the reflector 20. This is shown as light path 28. This may be achieved by a perforated design or by a material with suitable transmission vs. reflection properties. This light path 28 may instead be created by using additional light sources at the front face which will deliver light from the front of the reflector.

As described below, the system may be controlled to generate artificial lighting when the contrast between the window and wall surface is too high, and to rely on the external light to illuminate the wall around the window when this reduces the contrast sufficiently.

The contrast will depend on the direction in which the window faces.

For windows in the north façade of a building (for the northern hemisphere) there will be less light coming through the window but the view may still be into a bright sunny landscape. Even with use of the external light to provide illumination of the wall surface, additional lighting may be desired.

When the window is in the south façade (for the northern hemisphere) more daylight will be coming through the window so there will be less need for additional light if part of that incoming light is used for lighting the wall surface. For east or west oriented windows, lighting panels on the left and right sides may even be controlled independently since one side will receive much more light than the other so on one side more compensating extra artificial light is needed.

Figure 3:
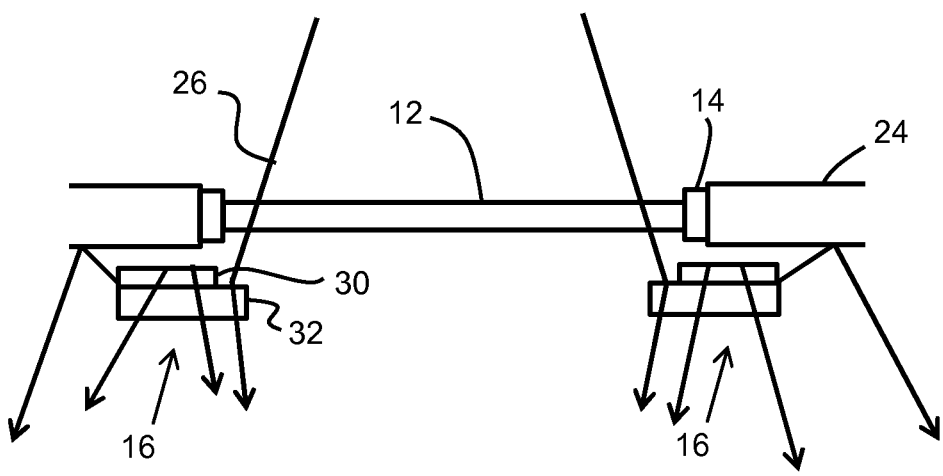
FIG. 3 shows a second example of a design of the lighting panels.

FIG. 3 shows an example in which each lighting panel 16 comprises a backlight 30 and a diffusive cover 32.

The diffusive cover 32 is for example a semi-translucent material which allows some of the daylight to pass through the material to increase the brightness.

For this purpose, an edge region 16a again overlaps the window. As shown, this may not have the backlight so that the external light directly reaches that portion of the cover 32. The cover spreads the light internally by scattering so that it causes the light to be output from the full area of the cover. The light may optionally also be emitted inwardly towards the wall surface or laterally outwardly, so that as in the example above, light reaches a larger area of the wall surface than the area of the lighting panel 16.

The backlight 30 may emit light forwardly, i.e. away from the wall surface, as shown. It may emit light in both forward and backward directions so that the light output comes both from the panel itself and by reflection from the wall surface.

Various possibilities will thus be apparent to those skilled in the art. The aim is to create lighting which is emitted or reflected from an area corresponding to the wall surface (at least) on each side of the window.

As for FIG. 2, the arrangement of FIG. 3 may be used without any overlap, and with the backlight covering the full area of the cover.

Figure 4:
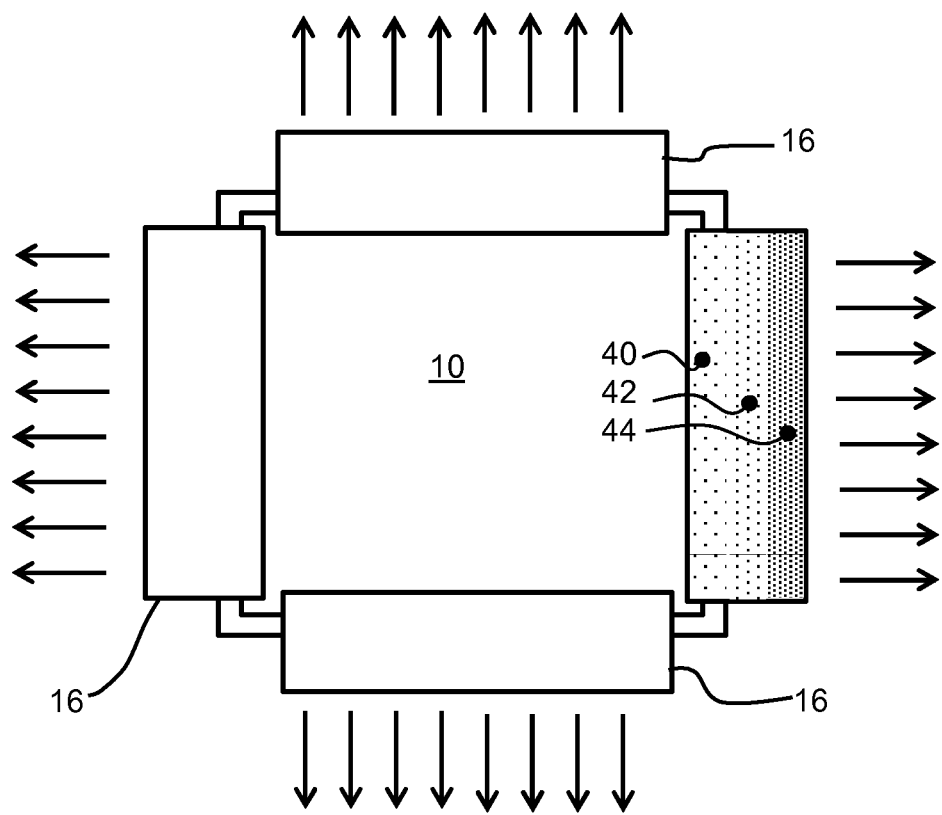
FIG. 4 shows that there may be lighting panels around all edges of the window.

FIG. 1 shows an example with only lateral lighting panels. These create a lighting effect in the left-right direction. As shown in FIG. 4 there may be lighting panels 16 around all edges of the window 10.

FIG. 4 also shows a further optional feature. Each panel may be designed to provide a non-uniform light output over its area, wherein the light output is greater at an edge for mounting adjacent or overlapping the window than at an edge for mounting away from the window. One panel is shown in FIG. 4 with this feature. It comprises a first portion 40 at an edge nearest (or overlapping) the window edge, a second portion 42 further out, and a third portion 44 at the other edge. The portion 40 is brighter than the portion 42 which is brighter than the portion 44.

This light distribution pattern may be a static feature of the panel design. For example in a reflector version, different amounts of light may be directed by the reflector to different wall surface regions. For the backlight design, the backlight may have a non-uniform LED density or the density of scattering materials within the cover may be non-uniform. There are many ways to create a non-uniform lighting pattern.

This approach provides a soft gradient between the bright window and the darker walls around the window.

Another optional feature is to provide the lighting panels with sound absorbing material.

Figure 5:

FIG. 5 shows an office space with two windows 10 each with blinds and a conventional lighting system with internal ceiling lights 50. In FIG. 5, the blinds are closed and the internal ceiling lighting is turned on. This situation is likely when there is bright light outside giving a large contrast between the windows and the wall surfaces around the windows. This situation is also likely to be maintained even when the excessively bright outdoor lighting conditions have passed, so that there will be energy wasted, and a reduced time when natural lighting is provided and a visible outdoor scene.

Figure 6:
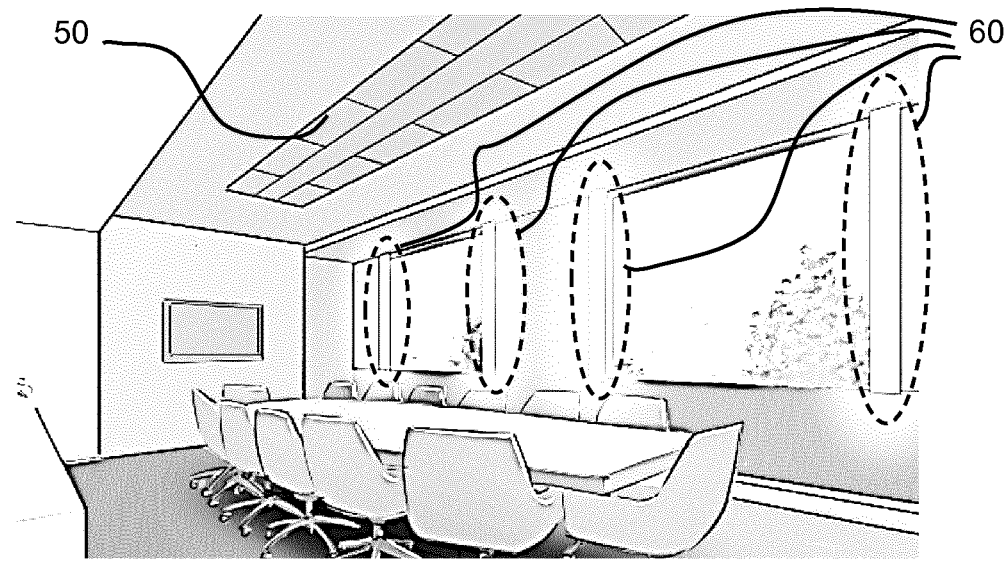
FIG. 6 shows the same office space with the lighting system of the invention providing light to regions to the sides of the windows, allowing the blinds to be open and the lights off.

FIG. 6 shows the same office space with the lighting system of the invention providing light to regions 60. As a result, the high contrast is reduced, and the natural light and view of the outside scenery can be maintained even during periods of bright outdoor lighting. The ceiling lights 50 are also turned off to save power. The wall lighting panels are lower power than the ceiling lighting.

Figure 7:
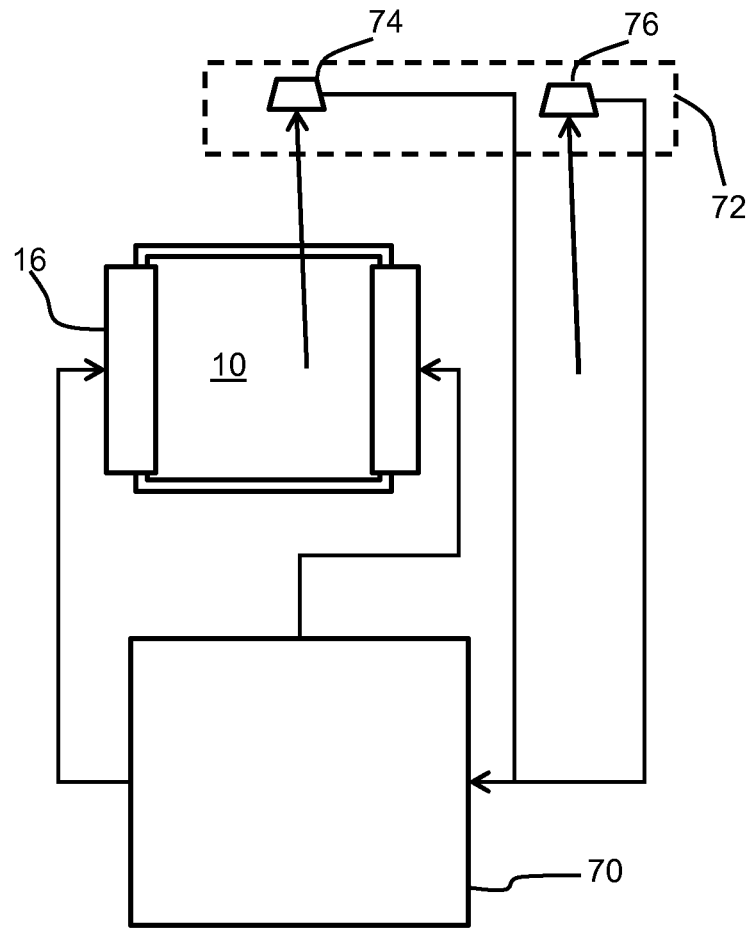
FIG. 7 shows an overall system.

FIG. 7 shows an overall system. The lighting panels 16 are controlled by a controller 70. The controller 70 receives an input from a light sensor arrangement 72. The light sensor arrangement may be for only sensing the external light entering the window or for measuring the brightness in a "picture" visible through the window (in this context, a "picture" is intended to mean the view visible through the window). However, in this example the light sensor arrangement 72 has a first light sensor 74 facing the window and a second light sensor 76 facing the wall surface adjacent the window 10. In this way, instead of measuring only the exterior lighting level, a contrast may be monitored and used as a feedback control parameter by the controller 70.

The light sensors may comprise light intensity sensors, but there may also be image analysis of the image viewed from the window, as explained further below. To set the right brightness levels for the lighting panels, the sensor arrangement may monitor the luminance levels (or the picture visible through the window) of the window and its surrounding walls, by measuring luminance levels at different positions. This method automatically takes into account the refection properties of the materials used in the interior space and in the exterior.

Weather influences may also be taken into account including the prevailing lighting conditions, but also a snow covered exterior for example. When the contrast difference between the window area and the surrounding walls is too high, the lighting panels are turned on and ramped up in brightness, using a feedback control approach. The lighting panels can in this way react by dimming up and down in brightness in real time to follow the dynamic daylight changes outside.

In night situations when there is no external light, a soft luminance can be given to the wall to function entirely as an aesthetic effect.

The system does not need to be limited to luminance measurement. By using sensors which detect color, and lighting panels with a controllable output color, a color or color temperature can be applied to the lighting panel light output to color the light in dependence on the daylight color temperature of the light falling into the space or the detected color points in the field of view visible through the window. The system may for example detect a blue sky and green trees and it may then color the vertical areas around the window with the same color, making the impression that the outdoor view is continued inside on the vertical walls.

This can also be used for decorative effects such as providing a feeling of sunlight to the interior on a cloudy day. At the same time this also allows the lighting panels to be used to change the experience in the space. For example, cold light during a hot summer's day can create a freshness experience in the room. In winter time, warm light can create a feeling of comfort. This concept can potentially also lead to energy savings since it will be possible to reduce the use of heating and air-conditioning systems.

The colored lighting can also be used to create biological clock effect. At sunset, but when the window does not face the setting sun, the lighting panels can provide a more reddish color to indicate sunset time. This gives a feeling of the time of day.

Colors can also be used purely decoratively, or to match with activities that are taking place. For example, a color scheme can be created that supports a brain storm activity or concentration or other activities.

The sensor may comprise a camera which can analyze the view through the window to provide image analysis as mentioned above. In particular, a range and distribution of colors visible through the window may be determined. The lighting panel can then display the same color as the dominant color in the window view, or a color which is becoming more dominant. There may be different colors for different regions around the window. For example, a panel which is next to the blue sky may be driven to a blue color and a panel which is next to green (plants) may be driven to a green color. The effect is that the window scene is enlarged by the lighting panels. This has the advantage that a feeling of nature can be brought into the building.

An additional possible control feature is to adjust the direction of the lighting, for example by rotating the reflector, in dependence on the sun position.

Figure 8:
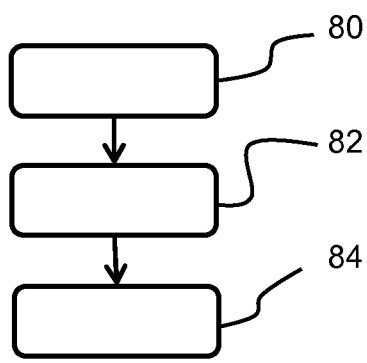
FIG. 8 shows method of providing interior lighting.

FIG. 8 shows method of providing interior lighting.

In step 80, exterior lighting is sensed which passes through a window into an interior space.

In step 82, lighting is provided from the wall surface around the outside of the window using an arrangement of lighting panels mounted at least on opposite lateral sides of the window.

In step 84, the lighting delivered by the arrangement of lighting panels is controlled in dependence on the sensed exterior lighting.

The sensing 80 may determine the color of the light entering the interior space through the window and the color temperature and/or color point of the lighting provided by the lighting panels is then controlled in dependence on the sensed color. The sensed color may be the most dominant color entering the space, or the window view may be divided into regions (i.e. by image analysis) with different colors identified for different regions.

The invention is of interest for all indoor workspaces and public meeting rooms, for example for offices, hospitality spaces, workshops, schools, hospitals, control rooms, industrial areas etc.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An interior lighting system comprising:
    an arrangement of lighting panels mounted at least on opposite lateral sides of a window and adjacent to the window for providing lighting visible as luminance at a wall surface around the outside of the window;
    a light sensor arrangement for sensing an exterior lighting level outside or through the window; and a controller for controlling the lighting delivered by the arrangement of lighting panels in dependence on the sensed exterior lighting level;

wherein each lighting panel includes a reflector for reflecting part of the exterior light which passes through the window to (i) the wall surface, (ii) a backlight, and (iii) a diffusive cover, each lighting panel has a first portion configured to overlap an edge of the window to thereby receive part of the exterior light that passes through the window and a second portion configured to overlap a wall around the edge of the window, and each lightning panel comprises a light source for directing light to the reflector.

2. A system as claimed in claim 1, wherein each lighting panel is controllable to provide a non-uniform light output over its area, wherein the light output is greater at an edge for mounting adjacent or overlapping the window than at an edge for mounting away from the window.

3. A system as claimed in claim 1, wherein each lighting panel further comprises sound absorbing material.

4. A system as claimed in claim 1, wherein the light sensor arrangement comprises a light sensor facing the window and a light sensor facing the wall surface adjacent the window.

5. A system as claimed in claim 1, wherein the color temperature and/or color point of the lighting provided by the lighting panel is controllable.

6. A system as claimed in claim 5, wherein the light sensor arrangement comprises a light sensor facing the window which has color sensing capability.

7. A system as claimed in claim 6, wherein the color temperature and/or color point of the lighting provided by the lighting panel is controllable in dependence on the sensed color.

8. A system as claimed in claim 1 comprising:
first and second lighting panels for mounting at opposite lateral sides of the window; or
first to fourth lighting panels for mounting all around the sides of the window.

9. A method of providing interior lighting, comprising:
sensing exterior lighting outside or through a window between an interior space and the exterior;
providing lighting from a wall surface around the outside of the window using an arrangement of lighting panels mounted at least on opposite lateral sides of the window and adjacent to the window, each lighting panel having a light source and a reflector, and the light source directing light to the reflector;
controlling the lighting delivered by the arrangement of lighting panels in dependence on the sensed exterior lighting;
overlapping a first portion of each lighting panel with an edge of the window and overlapping a second portion of each lighting panel with a wall around the edge of the window; and
reflecting part of the exterior light which reaches the first portion to the wall surface, and passing part of the exterior light that reaches the first portion through a diffusive panel cover.

10. A method as claimed in claim 9, comprising:
sensing the color of the light entering the interior space through the window, and
controlling the color temperature and/or color point of the lighting provided by the lighting panel in dependence on the sensed color.

* * * * *